United States Patent [19]
Nolte

[11] 4,243,064
[45] Jan. 6, 1981

[54] BYPASS VALVE FOR PUMPS, HEATING SYSTEMS AND THE LIKE

[75] Inventor: Ewald Nolte, Bielefeld, Fed. Rep. of Germany

[73] Assignee: Tuxhorn KG, Bielefeld, Fed. Rep. of Germany

[21] Appl. No.: 898,340

[22] Filed: Apr. 20, 1978

[30] Foreign Application Priority Data

Jun. 3, 1977 [DE] Fed. Rep. of Germany ....... 2725044
Jan. 27, 1978 [DE] Fed. Rep. of Germany ... 7802444[U]

[51] Int. Cl.$^3$ ............................................. G05D 11/00
[52] U.S. Cl. .................................... 137/117; 137/115; 137/116
[58] Field of Search ............... 137/115, 116, 117

[56] References Cited

U.S. PATENT DOCUMENTS

| | | | |
|---|---|---|---|
| 2,556,829 | 6/1951 | Teague, Jr. | 137/117 |
| 2,687,742 | 8/1954 | Crookston | 137/115 |
| 3,152,603 | 10/1964 | Zeisloft | 137/117 |
| 3,318,321 | 5/1967 | Odendahl | 137/117 |
| 3,662,774 | 5/1972 | Johannisson et al. | 137/115 |
| 3,957,075 | 5/1976 | Kunz et al. | 137/117 |

FOREIGN PATENT DOCUMENTS

| | | | |
|---|---|---|---|
| 12 | 6/1978 | European Pat. Off. | 137/115 |
| 1108992 | 6/1961 | Fed. Rep. of Germany | 137/117 |
| 1453783 | 4/1969 | Fed. Rep. of Germany | 137/117 |
| 1453786 | 5/1969 | Fed. Rep. of Germany | 137/115 |

Primary Examiner—William R. Cline
Assistant Examiner—H. Jay Spiegel
Attorney, Agent, or Firm—Peter K. Kontler

[57] ABSTRACT

A bypass valve with a tubular housing having an inlet at one end, a main outlet at the other end and a bypass outlet between the ends. A larger-diameter valving element controls the flow of fluid from the inlet to the main outlet, and a smaller-diameter valving element which is coaxial with the larger-diameter valving element controls the flow of fluid from the interior of the housing to the bypass outlet. The valving elements are mounted on a rod which confines them to movement in and counter to the direction of fluid flow from the inlet to the main outlet. Each valving element is movable by the fluid to an infinite number of positions in each of which they permit the fluid to flow to the respective outlets at a different rate. The smaller-diameter valving element is movable against an annular seat to seal the bypass outlet from the interior of the housing. The larger-diameter valving element can cooperate with a seat or is reciprocable in a tapering section of the housing so as to allow for continuous flow of fluid between the inlet and the main outlet. The rod is rigidly connected to the smaller-diameter valving element and is rigid with or reciprocable relative to the larger-diameter valving element.

6 Claims, 8 Drawing Figures

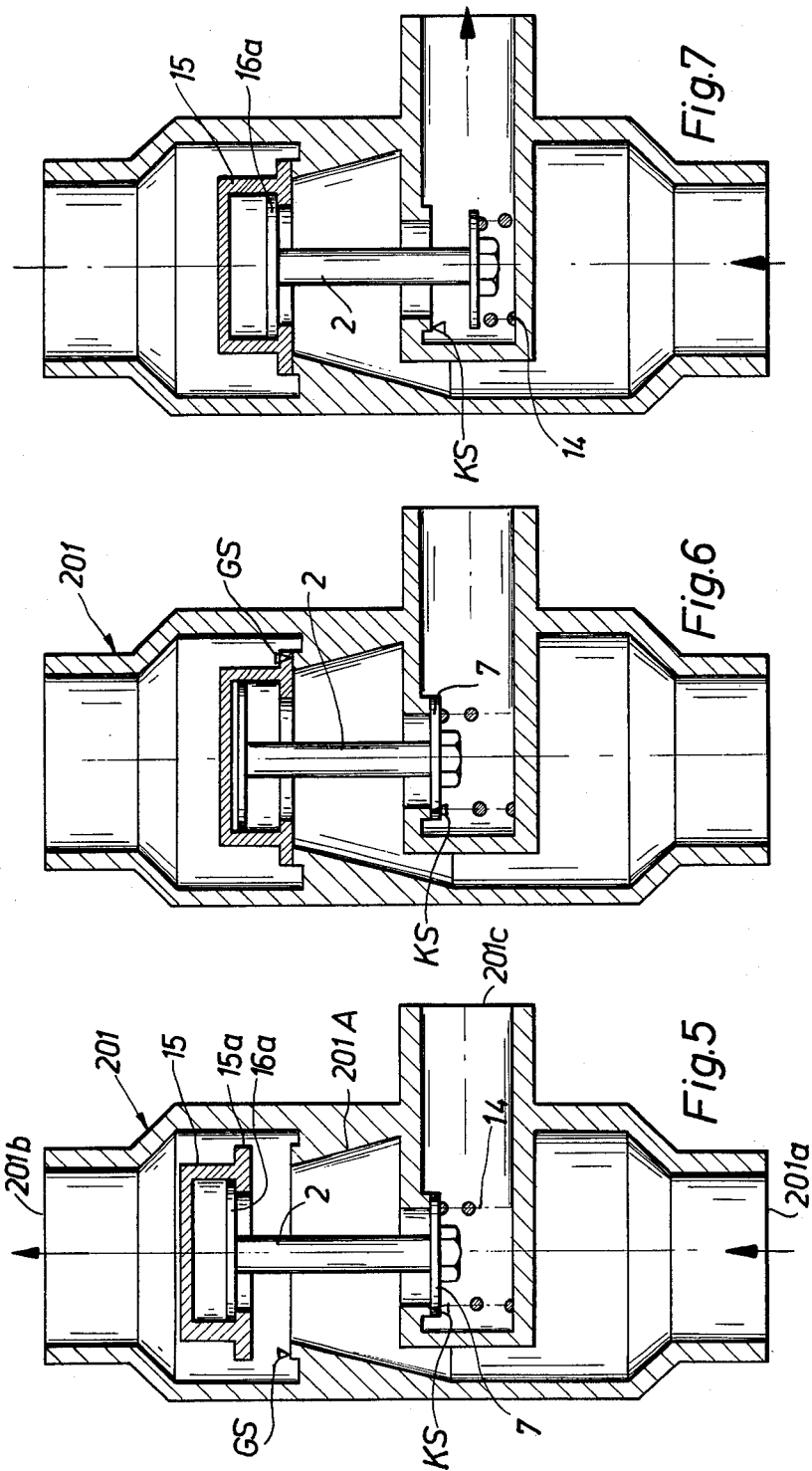

BYPASS VALVE FOR PUMPS, HEATING SYSTEMS AND THE LIKE

BACKGROUND OF THE INVENTION

The present invention relates to valves in general, and more particularly to improvements in bypass valves for use in pumping and/or heating systems. Still more particularly, the invention relates to improvements in bypass valves of the type wherein a relatively large valving element is coupled with a smaller valving element.

Bypass valves are utilized in a variety of fluid conveying systems. For example, a bypass valve can be used to direct some fluid from the pump discharge nozzle directly to the suction nozzle of the pump when it is undesirable or impractical to operate the pump at a greatly reduced rate of flow. Such valves are equally useful to prevent overheating of pumped fluid at part loads, for control reasons and/or for axial thrust compensation. Best known purposes of bypass valves are to relieve a pump and/or to insure the circulation of a fluid at a minimum rate regardless of fluctuations of the requirements of the consuming system or systems. For example, a relief or bypass port will be opened in automatic response to rising fluid pressure when the flow of fluid along the main path (i.e., from the inlet to the main outlet of a valve) is throttled or interrupted.

OBJECTS AND SUMMARY OF THE INVENTION

An object of the invention is to provide a simple, compact and inexpensive bypass valve which can divert the surplus of circulating fluid at an infinitely variable rate as a function of changes in the rate of fluid flow and independently of the pressure of conveyed fluid.

Another object of the invention is to provide a bypass valve which can be readily installed in existing pumping systems as a superior substitute for presently known bypass valves.

A further object of the invention is to provide the bypass valve with a novel and improved housing and with novel and improved means for controlling the flow of fluid from the inlet to the main outlet as well as to the bypass outlet of the housing.

An additional object of the invention is to provide a bypass valve with novel and improved means for coupling the elements which control the flow of fluid from the inlet to the main outlet and from the inlet to the bypass outlet of the housing.

Another object of the invention is to provide a combined bypass and check valve.

Another object of the invention is to provide a bypass valve which requires a minimum of maintenance and practically no adjustment.

A further object of the invention is to provide a bypass valve wherein the rate of outflow through the main outlet or through the bypass outlet can be reduced to zero.

The invention is embodied in a bypass valve for regulating the flow of a a fluid medium. The valve comprises a housing or body having a fluid-admitting inlet which can be connected to the outlet of a pump, a first or main fluid-discharging outlet which can deliver the fluid to one or more consumers in a closed or open circulating system, and a second or bypass outlet which is disposed intermediate the inlet and the first outlet. The valve further comprises a first valving element having a first fluid-contacting area and being movably installed in the housing intermediate the inlet and the first outlet to be moved by inflowing fluid between an infinite number of different positions in each of which the first valving element cooperates with the housing (either with a seat or with a suitably configurated flow restricting section of the housing) to establish first paths of different cross-sectional areas for the flow of fluid in a predetermined direction from the inlet to the first outlet, a second valving element having a different second fluid-contacting area and being movably installed in the housing to be moved by the fluid between an infinite number of positions in each of which the second valving element cooperates with the housing (preferably with an annular seat) to establish second paths of different cross-sectional areas for the flow of fluid from the housing to the bypass outlet, and means for confining the valving elements for movement in and counter to the aforementioned direction preferably in such a way that each valving element shares at least some movements of the other valving element. The confining means may include a rod which is rigid with both valving elements or a rod which is rigid with one of the valving elements and one or more springs which react against the rod and bear against the other valving element.

The novel features which are considered as characteristic of the invention are set forth in particular in the appended claims. The improved bypass valve itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 5 is an axial sectional view of a fourth bypass valve;

FIG. 6 illustrates the structure of FIG. 5, with one of the valving elements in a different position;

FIG. 7 illustrates the valve of FIG. 5 with the other valving element in a different position.

DESCRIPTION OF THE PREFERRED EMBODIMENTS

Figure 1:
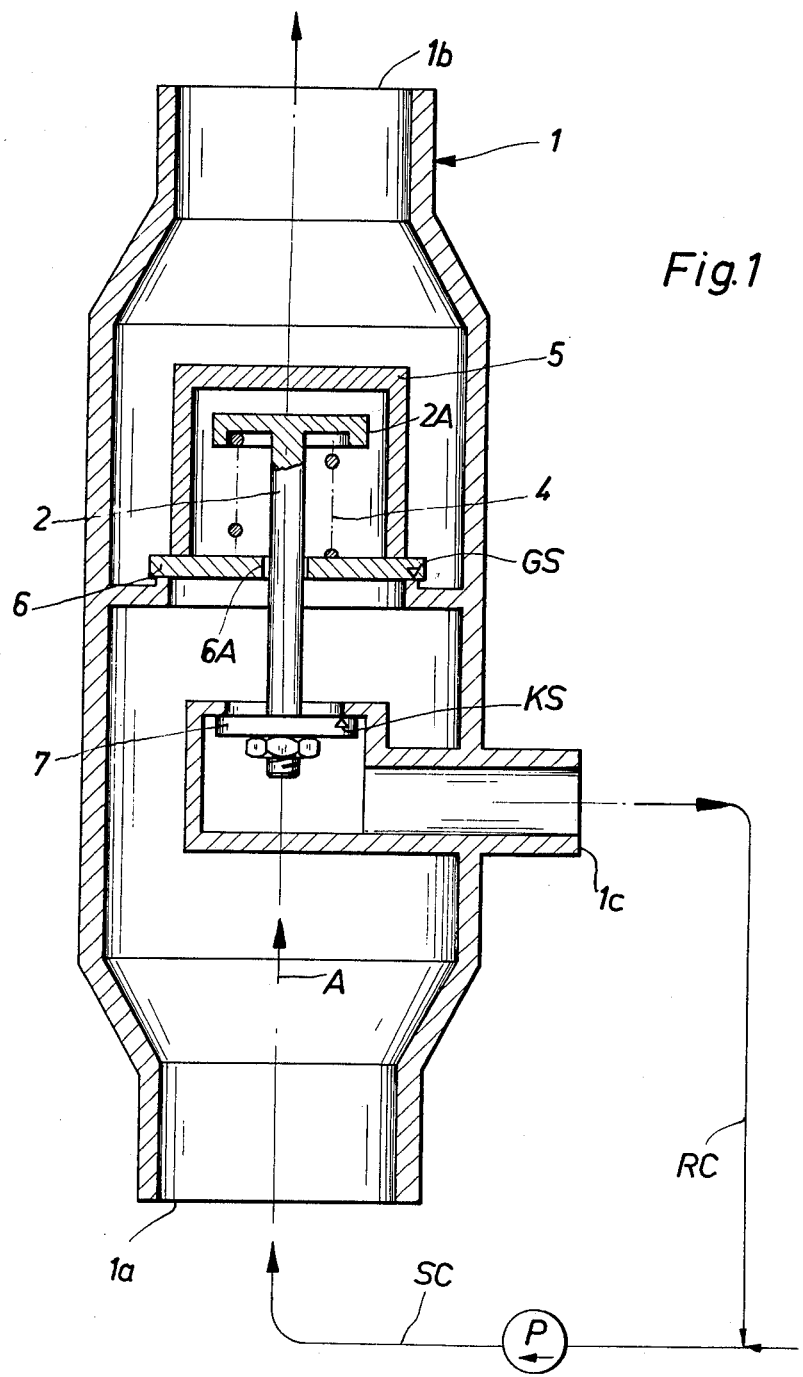
FIG. 1 is an axial sectional view of a bypass valve which embodies one form of the invention and is installed between the outlet of a pump and one or more consumers.

Referring to FIG. 1, there is shown a bypass valve which is installed in a supply conduit SC connected to the outlet of a self-priming pump P. The valve comprises a tubular housing or body 1 with an inlet 1a which communicates with the supply conduit SC, a first or main outlet 1b which delivers fluid to one or more consumers, and a second or bypass outlet 1c communicating with a return conduit RC which is connected to the suction intake of the pump P. The inlet 1a is in line with the first outlet 1b, and the bypass outlet is located between 1a and 1b.

The housing 1 is provided with two internal annular seats including a larger-diameter seat GS which cooperates with a larger-diameter disk-shaped valving element 6 and a smaller-diameter annular seat KS which cooperates with a smaller-diameter disk-shaped valving element 7. The valving elements 6 and 7 are coupled to each other by a confining or connecting rod 2. The latter is rigidly secured to the valving element 7 but is movable axially of the valving element 6. A helical spring 4 is provided to bias the valving element 6 against the seat GS and to simultaneously urge the valving element 7 against the seat KS. As shown, the spring 4 reacts against a collar-shaped retainer 2A of the rod 2 and bears against that side of the valving element 6 which faces away from the seat GS. The valving element 6 cooperates with the seat GS to control the flow of fluid from the inlet 1a toward and through the first outlet 1b. The valving element 7 cooperates with the seat KS to control the flow of fluid from the interior of the housing 1 (i.e., from the inlet 1a) through the bypass outlet 1c and into the return conduit RC.

The rod 2 is mounted in such a way that it can move in and counter to the direction (arrow A) of fluid flow from the inlet 1a toward the outlet 1b. If desired or necessary, the housing 1 may be provided with one or more internal arms which carry bearings for a portion of the rod 2 between the seats GS and KS. Also, the central opening 6A of the valving element 6 may receive a friction or antifriction bearing for the rod 2. A cupped member or hood 5 surrounds the spring 4 and collar 2 and is sealingly secured to the valving element 6 to prevent leakage of fluid from the inlet 1a to the outlet 1b when the valving element 6 is in sealing engagement with the respective seat GS. In the absence of the hood 5, fluid could leak through the central opening 6A of the valving element 6.

When the motor for the pump P is idle, the spring 4 is free to expand and to maintain the valving elements 6 and 7 in sealing engagement with the respective seats GS and KS. The valving element 6 then prevents the fluid from flowing in a direction from the outlet 1b toward the inlet 1a, and the valving element 7 seals the inlet 1a and the interior of the housing 1 from the return conduit RC. Thus, the valving element 7 prevents the flow of air from the interior of the housing 1 into the intake of the pump P when the pump motor is started again.

It is assumed that the valve of FIG. 1 is installed in a heating system which operates with a hot gaseous or hydraulic fluid. When the motor of the pump P is on, the supply conduit SC delivers heated fluid via inlet 1a and such fluid lifts the valving element 6 off the seat GS so that the fluid can flow through and beyond the outlet 1b. The lifted valving element 6 stresses the spring 4 and causes the rod 2 to maintain the valving element 7 in sealing engagement with the seat KS. The just described situation will arise in open position(s) of one or more heat regulating valves (not shown) installed in the conduit which is connected to the outlet 1b and conveys fluid to one or more radiators in a dwelling or the like. On closing or partial closing of one or more heat regulating valves downstream of the outlet 1b, the pressure differential upon the valving element 6 decreases and the pressure upon the valving element 7 increases. When the pressure of fluid upon the upper side of the valving element 7 matches and begins to exceed the bias of the spring 4, the valving element 7 starts to move away from the seat KS and permits some fluid to flow into the return conduit RC. The rate at which the valving element 7 permits fluid to flow into the conduit RC matches the throttling action upon the fluid flowing from the inlet 1a toward the first outlet 1b.

Figure 2:
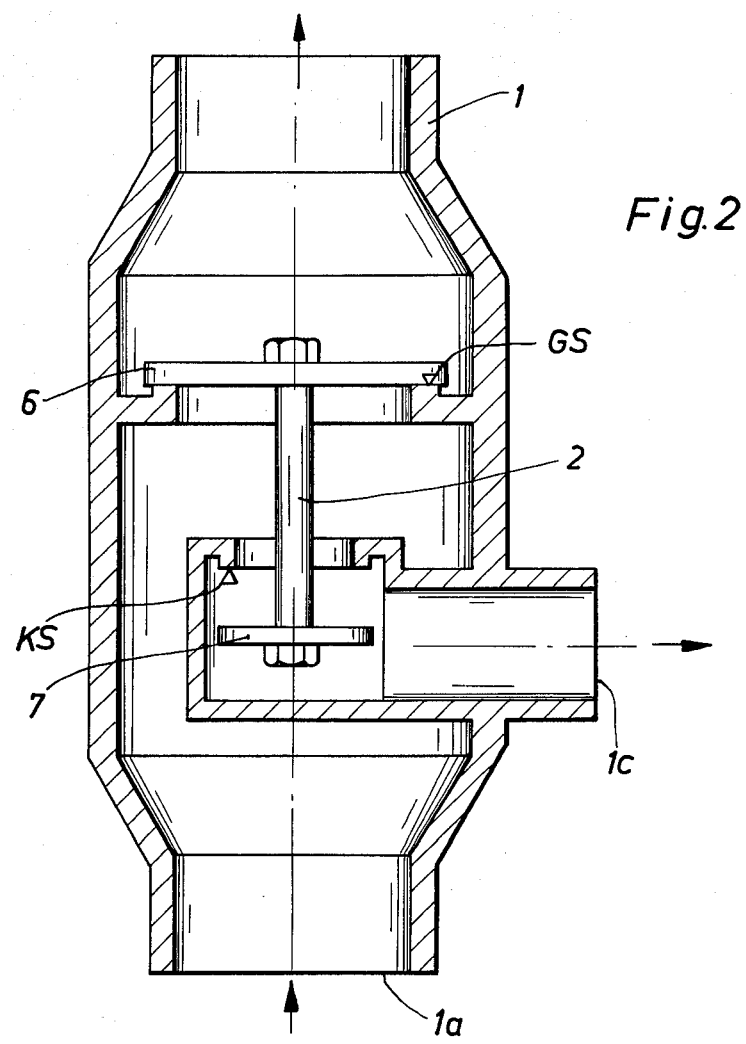
FIG. 2 is a similar axial sectional view of a modified bypass valve.

The bypass valve of FIG. 2 is similar to the valve of FIG. 1. The difference is that the confining rod 2 is rigidly connected with both valving elements 6 and 7, i.e., the inlet 1a invariably communicates with the bypass outlet 1c when the valving element 6 is held in closed or partly open position. This bypass valve can be installed in closed heating systems. The bypass outlet 1c admits fluid into the intake of the pump.

Figure 3:
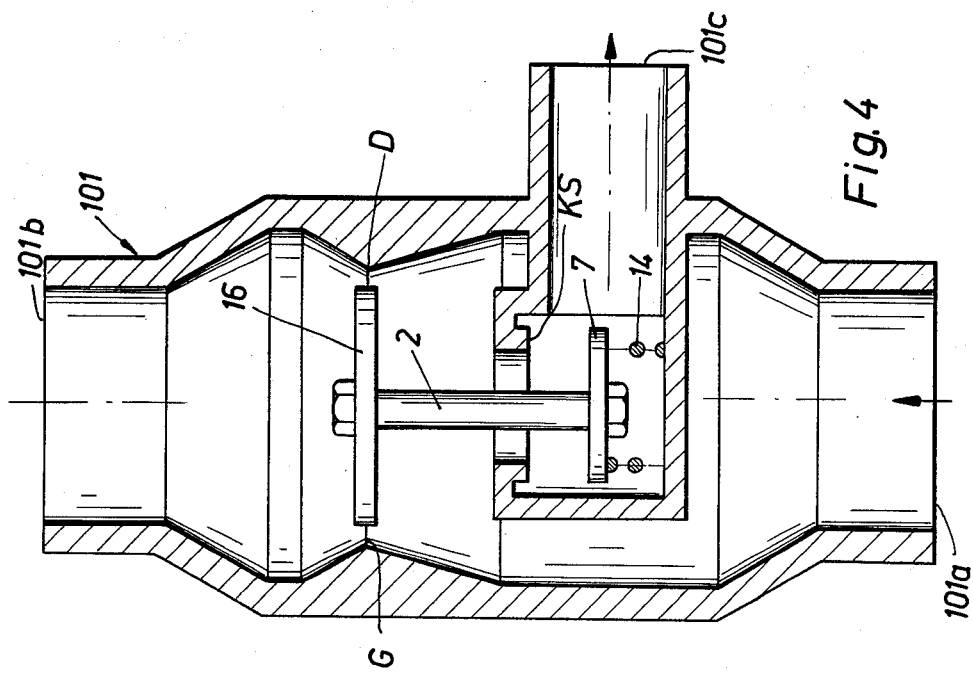
FIG. 3 is an axial sectional view of a third bypass valve.
Figure 4:
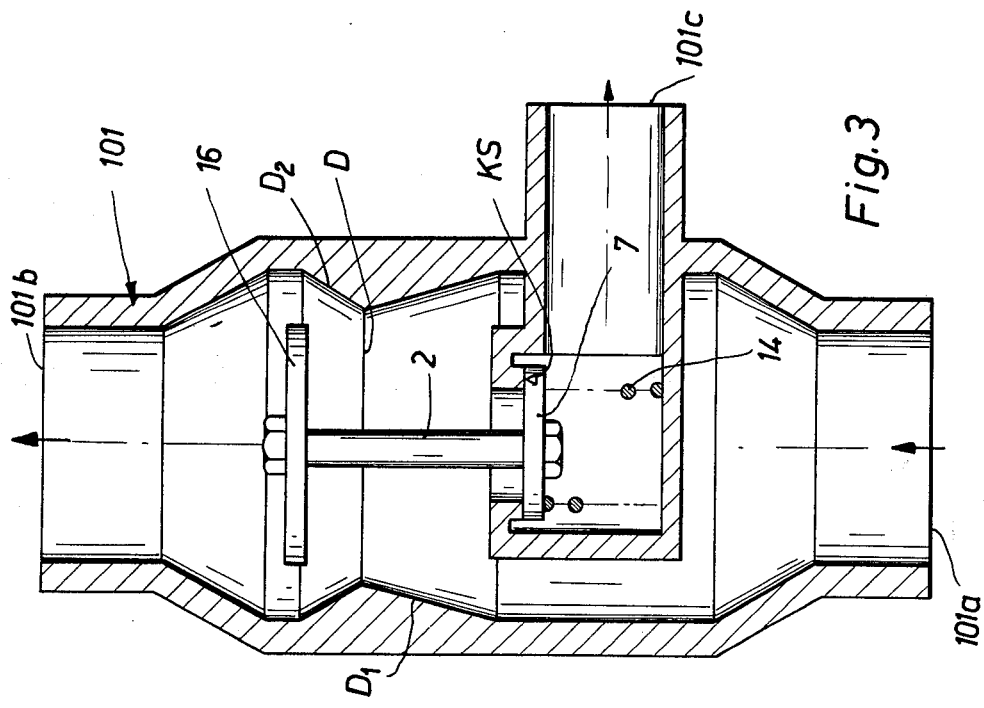
FIG. 4 illustrates the structure of FIG. 3, with the valving elements in different positions.

In the bypass valve of FIGS. 3 and 4, the larger-diameter disk-shaped valving element 16 is rigid with one end portion of the confining or connecting rod 2, and the smaller-diameter valving element 7 for the seat KS is rigid with the other end portion of the rod. The housing or body 101 of the valve does not have a pronounced seat for the valving element 16. The latter throttles the flow of fluid from the inlet 101a to the first outlet 101b at a variable rate due to configuration of that portion of the housing 101 which surrounds the element 16. The just mentioned portion of the housing has a portion D of minimum-diameter which surrounds the valving element 16 when the latter assumes that end position in which it furnishes a maximum throttling action (see FIG. 4). The throttling action decreases when the valving element 16 moves from the end position of FIG. 4 toward the other end position (shown in FIG. 3) in which the flow of fluid from the inlet 101a toward the outlet 101b is practically unobstructed. The bypass outlet 101c is sealed in the end position which the valving element 16 assumes in FIG. 3, and the valving element 7 allows the fluid to flow into the outlet 101c at a maximum rate when the valving element 16 is held in the end position of FIG. 4. A helical spring 14 which reacts against a portion of the housing 101 ahead of the bypass outlet 101c but downstream of the seat KS bears against the underside of the valving element 7 and urges the latter to the sealing position.

It will be seen that, in each of its positions, the valving element 16 defines with the housing 1 an annular clearance or gap G which establishes a portion of an elongated path for the flow of fluid between the inlet 101a and outlet 101b. The portion D constitutes the narrowest part of a section D2 (of the housing 101) which tapers in a direction away from the outlet 101b. A further section D1 tapers in the opposite direction, i.e., toward the outlet 101b upstream of the section D2. The cross-sectional area of the clearance G decreases when the rate of flow of fluid into the bypass 101c increases, and vice versa. Moreover, the aforementioned housing section D1 which tapers toward the section D2 causes the fluid which enters via inlet 101a and flows toward the outlet 101b to impinge upon the underside of the valving element 16. When the valving element 16 moves from the position of FIG. 4 toward the position of FIG. 3, the resistance which the element 16 offers to the flow of fluid into the outlet 101b decreases.

The spring 14 insures that the bypass outlet 101c is sealed from the inlet 101a and outlet 101b when the motor for the pump which delivers fluid to the inlet 101a is arrested.

The differential in pressure of fluid at the inlet 101a and outlet 101b is zero. This is due to the fact that the valving element 16 does not move against a seat in any of its positions including the two end positions. The path for the flow of fluid from the inlet 101a to the outlet 101b is a substantially straight path. The bias of the spring 14 is selected in such a way that this spring automatically seals the inlet 101a and outlet 101b from the bypass outlet 101c when the motor of the pump is idle but that the spring 14 cannot influence the regulation of fluid flow from the inlet 101a to the outlet 101b. When the pump delivers fluid to the inlet 101a and the conduit which receives fluid from the outlet 101b is open, the fluid which flows through the housing 101 acts upon the valving element 16 which, in turn, causes the rod 2 to maintain the valving element 7 in sealing engagement with the seat KS.

When the rate at which the outlet 101b can admit fluid into one or more conduits decreases, the speed of the fluid which flows through the housing 1 decreases and the force which the fluid applies against the valving element 16 also decreases. When the ratio of forces acting upon the valving elements 16 and 7 is tilted in favor of the valving element 7, the latter starts to move from the sealing position of FIG. 3 and allows fluid to flow into the bypass outlet 101c. The rate of admission of fluid into the outlet 101c increases proportionally with the rate at which the rate of fluid flow from the inlet 101a toward and through the outlet 101b decreases. The transition from stage to stage is gradual, i.e., each of the valving elements 7 and 16 can be moved to an infinite number of intermediate positions. Moreover, these valving elements can remain in each intermediate position for any interval of time.

An advantage of the bypass valve which is shown in FIGS. 3 and 4 is that the housing 101 is simpler than the housing 1. This is due to the fact that the housing 101 need be provided only with a single seat (KS) for the valving element 7 of smaller diameter. As mentioned above, the conical internal surface of the housing section D1 directs the fluid against the underside of the valving element 16. At the same time, the valving element 16 and the section D2 define a clearance whose cross-sectional area is large enough for the flow of fluid around the valving element 16 and on toward and beyond the outlet 101b. The cross-sectional area of the clearance G increases when the valving element 16 is caused to leave the end position of FIG. 4 because the internal surface of the section D2 tapers in a direction toward the seat KS.

FIGS. 5, 6 and 7 illustrate a fourth bypass valve wherein the valving element 7 and its seat KS cooperate in the same way as described in connection with FIGS. 3 and 4. The valving element 16a is directly connected with the respective end of the confining or connecting rod 2 and can be moved into or from sealing engagement with an annular seat GS of the housing 201. This valving element is reciprocable in a suitably configurated third valving element or bonnet 15 which, together with the seat GS, constitutes a check valve serving to prevent the flow of fluid from the outlet 201b toward the inlet 201a. The bypass valve of FIGS. 5 to 7 can be used in pumping systems which operate with a substantial pressure head and wherein the pump is arrested at regular or irregular intervals. The housing 201 includes a section 201A which tapers in a direction toward the seat GS. The bias of the spring 14 for the valving element 7 is selected in such a way that the element 7 sealingly engages the seat KS when the pump is started and the pressure at the bypass outlet 201c drops below atmospheric pressure.

FIG. 5 shows the mobile parts of the bypass valve in positions they assume when the outlet 201b is free to communicate with the inlet 201a, i.e., when the motor of the pump is on and the outlet 201b can admit inflowing fluid to one or more consumers. The valving element 16a maintains the valving element 7 in sealing engagement with the seat KG and the bonnet 15 is held in the upper end position with respect to the valving element 16a, i.e., the check valve 15, GS is fully open. The fluid which enters the housing 201 via inlet 201a and leaves the housing via outlet 201b flows along a substantially straight path.

The mobile parts of the bypass valve assume the positions of FIG. 6 when the motor of the pump is idle. The check valve is closed, i.e., the bonnet 15 engages the seat GS, and the valve including the element 7 and seat KS is also closed because the spring 14 is free to expand. The axial length of the bonnet 15 is selected in such a way that the flange 15a of this bonnet can engage the seat GS while the valving element 7 engages the seat KS.

In FIG. 7, the check valve 15, GS is closed and the bypass outlet 201c is free to communicate with the inlet 201a.

Figure 8:
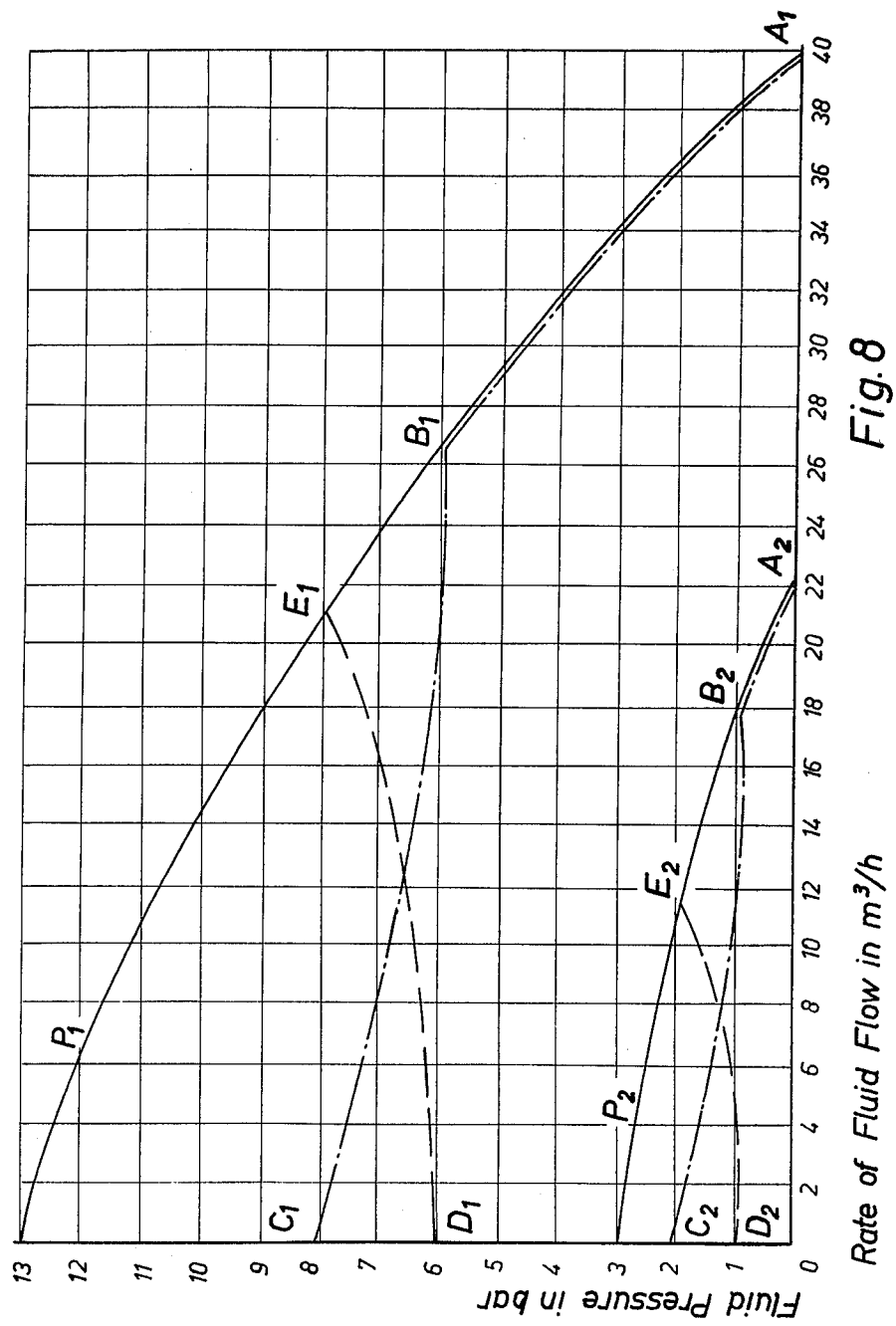
FIG. 8 is a diagram showing the relationship of the rates of fluid flow through one of the improved bypass valves when the fluid is supplied by a larger-capacity and a smaller-capacity pump.

In the diagram of FIG. 8, the rate of fluid flow (in cubic meters per hour) is measured along the abscissa, and the pressure of fluid (in bar) is measured along the ordinate. The housing of the valve whose characteristics are shown in FIG. 8 is assumed to have a diameter ot two inches.

When the rate of fluid flow from the inlet to the first outlet is maximal, the quantity of fluid entering via inlet matches the quantity of fluid which is discharged via first outlet. The diagram of FIG. 8 shows two modes of operation, namely, a first situation when the inlet receives fluid from a pump having a higher output and a second situation when the inlet receives fluid from a pump having a lower output. The rate of fluid flow through the housing in the two situations is shown at A1 and A2. When the rate at which the first outlet can discharge fluid decreases, the rate of fluid outflow via first outlet decreases proportionally with the characteristic curve (P1 or P2) of the respective pump. This is indicated by phantom lines between the points A1-B1 and A2-B2. It will be noted that the rate of outflow can be regulated infinitely.

Between the points B1-C1 and B2-C2, the rate of outflow of fluid via first outlet can be regulated infinitely and such rate reaches the rate zero at the points C1 and C2. The just outlined reduction in the rate of outflow via first outlet takes place simultaneously with an increase of the rate of fluid flow from the inlet to and beyond the bypass outlet. Such rate is indicated by the broken-line curves of FIG. 8. Thus, for the pump P1, the rate of fluid flow via return conduit increases from D1 to E1. For the pump P2, the same rate increases from D2 to E2. Between the points B and C, the bypass valve can furnish any combination of flow of fluid from the inlet to the two outlets, and each of these combinations can be maintained for any desired interval of time. The positions of points B and E on the respective characteristic curves P1 and P2 can be selected by appropriate selection of the ratio of diameters of the two valving elements.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the claims.

What is claimed is:

1. A bypass valve for regulating the flow of a fluid, comprising a valve member having an axis and including a larger-diameter main valve portion and a smaller-diameter bypass valve portion rigid with and axially spaced from said main valve portion; and a housing having a fluid-admitting inlet, a fluid-discharging main outlet aligned with said inlet, a passage communicating said inlet with said main outlet, a fluid-discharging bypass outlet communicating with said passage intermediate said inlet and said main outlet, and a valve seat for said bypass valve portion at said bypass outlet, said housing accommodating said valve member for axial displacement between a first end position in which said bypass valve portion engages, and a second end position in which said bypass valve portion is axially spaced from, said valve seat, said passage having, as considered in the flow direction, a diverging section accommodating said main valve portion with a clearance in all positions of said valve member so that the fluid flows past said main valve portion at rates which gradually increase as said valve member is displaced from said second toward said first end position thereof, and a converging section situated upstream of said diverging section and directing the flow of the fluid against said main valve portion.

2. A valve as defined in claim 1, wherein said valve portions are circular disks and said sections of said passage are conical.

3. A bypass valve for regulating the flow of a fluid, comprising a housing having a fluid-admitting inlet, a first fluid-discharging outlet, a second fluid-discharging bypass outlet intermediate said inlet and said first outlet, an annular zone of minimum cross section intermediate said first and second outlets, and an annular section intermediate said second outlet and said annular zone, merging with the latter and converging toward the same as considered in a direction of flow of fluid from said inlet to said first outlet; a first valving element disposed in said housing intermediate said inlet and said first outlet, said valving element having a first fluid-contacting area and being movable by inflowing fluid between an infinite number of positions in each of which said valving element defines with said housing a clearance establishing first paths of different cross-sectional areas for the flow of fluid in said direction in a range commencing at an end position in which said first valving element defines a clearance of minimum cross-sectional area with said annular zone and extending downstream from the latter so that said annular section directs the flow of fluid against said first valving element; a second valving element disposed in said housing intermediate said inlet and said second outlet, said second valving element having a second fluid-contacting area different from said first area and being movable by the fluid in said housing between an infinite number of positions in each of which said second valving element cooperates with said housing to establish second paths of different cross-sectional areas for the flow of fluid from said housing through said second outlet; and means for confining said valving element to movement in and counter to said predetermined direction in response to the action of the fluid on said valving elements.

4. A valve as defined in claim 2, wherein said housing includes a seat for said second valving element and further comprising means for biasing said second valving element against said seat.

5. A valve as defined in claim 2, wherein said housing includes an additional annular section disposed intermediate said annular zone and said first outlet and diverging in said direction, said first valving element being located within said additional section and being movable therein through said range to and from said end position.

6. A valve as defined in claim 5, wherein said confining means maintains said second valving element in a position in which said second valving element permits the fluid to flow at a maximum rate toward and into said second outlet in said end position of said first valving element.

* * * * *